United States Patent
Ishizaki et al.

(10) Patent No.: US 8,673,173 B2
(45) Date of Patent: Mar. 18, 2014

(54) OXYGEN-ABSORBABLE SOLVENT-SOLUBLE RESIN AND OXYGEN-ABSORBABLE ADHESIVE RESIN COMPOSITION

(75) Inventors: Yoichi Ishizaki, Yokohama (JP); Yoshihiro Ohta, Yokohama (JP); Yui Yamaguchi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 66 days.

(21) Appl. No.: 13/255,057

(22) PCT Filed: Mar. 8, 2010

(86) PCT No.: PCT/JP2010/053792
§ 371 (c)(1),
(2), (4) Date: Sep. 6, 2011

(87) PCT Pub. No.: WO2010/101290
PCT Pub. Date: Sep. 10, 2010

(65) Prior Publication Data
US 2012/0001121 A1    Jan. 5, 2012

(30) Foreign Application Priority Data

Mar. 6, 2009 (JP) ................................. 2009-054081
Jan. 15, 2010 (JP) ................................. 2010-006832

(51) Int. Cl.
| C01B 3/00 | (2006.01) |
| C01B 6/00 | (2006.01) |
| C02F 1/70 | (2006.01) |
| C06B 23/00 | (2006.01) |
| C06B 43/00 | (2006.01) |
| C09K 3/00 | (2006.01) |

(52) U.S. Cl.
USPC ..................................... 252/188.28; 524/601

(58) Field of Classification Search
CPC ... C08L 67/02; C08L 2203/16; C08G 63/183; A23L 3/3436; B65D 81/226; C09D 167/02; C09J 167/02
USPC ..................................... 252/188.28; 524/601
See application file for complete search history.

(56) References Cited

U.S. PATENT DOCUMENTS

| 7,078,100 B2 * | 7/2006 | Ebner et al. ................. 428/411.1 |
| 7,842,361 B2 | 11/2010 | Ohta et al. |
| 2008/0227912 A1 | 9/2008 | Ohta et al. |
| 2009/0098323 A1 | 4/2009 | Ohta et al. |
| 2010/0087619 A1 | 4/2010 | Ohta et al. |

FOREIGN PATENT DOCUMENTS

| CN | 101360774 A | 2/2009 | |
| EP | 0 536 629 A2 | 4/1993 | |
| EP | 536629 A2 * | 4/1993 | ............. C08L 67/06 |
| JP | 11209731 A | 8/1999 | |
| JP | 2006131699 A | 5/2006 | |
| JP | 2006160787 A | 6/2006 | |
| JP | 2006160787 A * | 6/2006 | |
| JP | 2007302874 A | 11/2007 | |
| JP | 2008038126 A | 2/2008 | |
| WO | WO-2006080500 A1 | 8/2006 | |
| WO | WO-2007119657 A1 | 10/2007 | |

OTHER PUBLICATIONS

Office action from corresponding Chinese patent application No. 201080019678.4, dated Nov. 1, 2012.
International Search Report for PCT/JP2010/053792 dated Apr. 6, 2010.
Written Opinion for PCT/JP2010/053792 dated Apr. 6, 2010.
Extended European Search Report for Application No. 10748881.9, dated Aug. 14, 2013.

* cited by examiner

*Primary Examiner* — Harold Pyon
*Assistant Examiner* — Tanisha Diggs
(74) *Attorney, Agent, or Firm* — Marshall, Gerstein & Borun LLP

(57) ABSTRACT

Disclosed is an oxygen-absorbable solvent-soluble resin having both oxygen absorbability and adhesive properties. Specifically disclosed is an oxygen-absorbable solvent-soluble resin which comprises an acid component (A), an acid component (B) and a polyester having a constituent unit derived from a glycol component, wherein the ratio of the amount of the acid component (A) to the total amount of the acid components is 40 to 80 mol % and the ratio of the amount of the acid component (B) to the total amount of the acid components is 15 to 35 mol %. The acid component (A):tetrahydrophthalic acid or a derivative thereof, or tetrahydrophthalic anhydride or a derivative thereof; and the acid component (B):terephthalic acid.

7 Claims, No Drawings

OXYGEN-ABSORBABLE SOLVENT-SOLUBLE RESIN AND OXYGEN-ABSORBABLE ADHESIVE RESIN COMPOSITION

This is an application filed under 35 U.S.C. 371 of PCT/JP2010/053792, filed Mar. 8, 2010, which claims priority from Japan Application 2010-006832, filed Jan. 15, 2010 and Japan Application 2009-054081, filed Mar. 6, 2009.

TECHNICAL FIELD

The present invention relates to an oxygen-absorbing solvent-soluble resin excellent in solubility to a solvent, adhesiveness, and oxygen absorption ability, and to an oxygen-absorbing adhesive resin composition.

BACKGROUND ART

Various packaging materials having a gas barrier property are proposed in order to increase the content storage performance. Recently, attraction has been focused particularly on an oxygen absorbing packaging container which is a packaging container employing a material having an oxygen absorption ability. As one of methods for forming an oxygen absorbing packaging container, a method is proposed in which an oxygen-absorbing resin composition is applied as a paint or an adhesive.

Patent Literature 1 proposes an oxygen-absorbing adhesive in which a polyol is blended with an inorganic oxide having an oxygen absorption ability. However, the oxygen-absorbing adhesive has problems such as being opaque and low in oxygen absorption ability, and the oxygen-absorbing adhesive needs water to exhibit the oxygen absorption ability and cannot be used in a dry atmosphere. Meanwhile, various oxygen-absorbing resins are proposed (for example, Patent Literature 2). However, there is no case that an oxygen-absorbing adhesive resin having both an oxygen absorption ability and adhesiveness is formed for lamination of a packaging film.

CITATION LIST

Patent Literatures

Patent Literature 1: Japanese Patent Application Publication No. 2006-131699
Patent Literature 2: International Patent Application No. WO2006/080500

SUMMARY OF INVENTION

Accordingly, an object of the present invention is to provide an oxygen-absorbing solvent-soluble resin having both an oxygen absorption ability and adhesiveness, and an oxygen-absorbing adhesive resin composition using the same.

The present invention provides an oxygen-absorbing solvent-soluble resin which is a polyester comprising structural units derived from an acid component (A), an acid component (B), and a glycol component, wherein
the ratio of the amount of the acid component (A) to the total amount of the acid components is 40 to 80 mol %,
the ratio of the amount of the acid component (B) to the total amount of the acid components is 15 to 35 mol %,
acid component (A) is tetrahydrophthalic acid, a derivative thereof, tetrahydrophthalic anhydride, or a derivative thereof, and
acid component (B) is terephthalic acid.

The present invention also provides an oxygen-absorbing solvent-soluble resin which is a polyester comprising structural units derived from an acid component (A), succinic acid, and ethylene glycol, wherein
the ratio of the amount of the acid component (A) to the total amount of the acid components is 45 to 75 mol %,
the ratio of the amount of succinic acid to the total amount of the acid components is 25 to 55 mol %, and
acid component (A) is tetrahydrophthalic acid, a derivative thereof, tetrahydrophthalic anhydride, or a derivative thereof.

The present invention further provides an oxygen-absorbing adhesive resin composition comprising: the oxygen-absorbing solvent-soluble resin; and ethyl acetate as a solvent.

The present invention makes it possible to provide an oxygen-absorbing solvent-soluble resin having both an oxygen absorption ability and adhesiveness.

DESCRIPTION OF EMBODIMENTS

A first embodiment of an oxygen-absorbing solvent-soluble resin of the present invention is a polyester comprising structural units derived from an acid component (A), an acid component (B), and a glycol component.

In the first embodiment of the oxygen-absorbing solvent-soluble resin of the present invention, the acid component (A) is tetrahydrophthalic acid, a derivative thereof, tetrahydrophthalic anhydride, or a derivative thereof. The acid component (A) is preferably methyltetrahydrophthalic acid or methyltetrahydrophthalic anhydride.

Moreover, in the first embodiment of the oxygen-absorbing solvent-soluble resin of the present invention, the acid component (A) preferably comprises 50 to 100 mol %, preferably 60 to 100 mol %, of an acid component having a structure selected from the group consisting of the following (i) and (ii):

(i) a dicarboxylic acid or a dicarboxylic anhydride comprising a carbon atom bonded to both groups in the following structures (a) and (b) and further bonded to one hydrogen atom, the carbon atom being contained in an alicyclic structure;
  (a) a carbon-carbon double bond group, and
  (b) a carbonyl group; and
(ii) a dicarboxylic acid or a dicarboxylic anhydride in which
  a carbon atom adjacent to a carbon-carbon double bond in an unsaturated alicyclic structure is bonded to an electron donating substituent and a hydrogen atom,
  another carbon atom adjacent to the carbon atom is bonded to a carbonyl group, and
  the electron donating substituent and the carbonyl group are in the cis position.

The carbonyl groups in the above-described structures (i) and (ii) indicate ones contained in the dicarboxylic acid and the dicarboxylic anhydride in the structures of tetrahydrophthalic acid and tetrahydrophthalic anhydride.

The acid component having the structure (i) includes a derivative of $\Delta^2$-tetrahydrophthalic acid, a derivative of $\Delta^3$-tetrahydrophthalic acid, a derivative of $\Delta^2$-tetrahydrophthalic anhydride, and a derivative of $\Delta^3$-tetrahydrophthalic anhydride. Preferable is a derivative of $\Delta^3$-tetrahydrophthalic acid or a derivative of $\Delta^3$-tetrahydrophthalic anhydride, and particularly preferable is 4-methyl-$\Delta^3$-tetrahydrophthalic acid or 4-methyl-$\Delta^3$-tetrahydrophthalic anhydride. For example, 4-methyl-$\Delta^3$-tetrahydrophthalic anhydride can be obtained by subjecting an isomer mixture containing 4-methyl-$\Delta^4$-tetrahydrophthalic anhydride, which is prepared by reacting, $C_5$ fraction of naphtha mainly containing isoprene with maleic anhydride, to structural isomerization, and is industrially produced.

As the acid component having the structure (ii), particularly preferable is cis-3-methyl-$\Delta^4$-tetrahydrophthalic acid or cis-3-methyl-$\Delta^4$-tetrahydrophthalic anhydride. For example, cis-3-methyl-$\Delta^4$-tetrahydrophthalic anhydride can be obtained by reacting $C_5$ fraction of naphtha mainly containing trans-piperylene with maleic anhydride, and is industrially produced.

Tetrahydrophthalic acid, a derivative thereof, tetrahydrophthalic anhydride, or a derivative thereof can be a large number of compounds. Among them, the acid component having the structure (i) and the acid component having the structure (ii) described above can be preferably used as a raw material of the first embodiment of the oxygen-absorbing solvent-soluble resin of the present invention because of the quite high reactivity with oxygen. The acid component having the structure (i) and the acid component having the structure (ii) can be used alone, or may be preferably used in any combination of at least two of them. A mixture of 4-methyl-$\Delta^3$-tetrahydrophthalic anhydride preferable as the structure (i) and cis-3-methyl-$\Delta^4$-tetrahydrophthalic anhydride preferable as structure (ii) can be obtained easily at low cost as an industrial product by subjecting a mixture of cis-3-methyl-$\Delta^4$-tetrahydrophthalic anhydride and 4-methyl-$\Delta^4$-tetrahydrophthalic anhydride, which are prepared by reacting $C_5$ fraction of naphtha mainly containing trans-piperylene and isoprene with maleic anhydride, to structural isomerization. The use of such an inexpensive isomer mixture as the raw material of the first embodiment of the oxygen-absorbing solvent-soluble resin of the present invention is particularly preferable from the viewpoint of industrial use.

In polymerizing the oxygen-absorbing polyester which is the first embodiment of the oxygen-absorbing solvent-soluble resin of the present invention using as the raw material tetrahydrophthalic acid, a derivative thereof, tetrahydrophthalic anhydride, or a derivative thereof, the dicarboxylic acid and the dicarboxylic anhydride may be esterified into methyl ester or the like.

Moreover, in the first embodiment of the oxygen-absorbing solvent-soluble resin of the present invention which can be obtained by polymerizing raw materials including tetrahydrophthalic acid, a derivative thereof, tetrahydrophthalic anhydride, or a derivative thereof, an oxygen absorption reaction catalyst (oxidization catalyst) may be added to accelerate the oxygen absorption reaction. Nevertheless, the first embodiment of the oxygen-absorbing solvent-soluble resin of the present invention which can be obtained by polymerizing the raw materials including the acid component having the structure (i) and the acid component having the structure (ii) described above has a quite high reactivity with oxygen. Thus, the oxygen-absorbing solvent-soluble resin can exhibit a practically acceptable ability to absorb oxygen in the absence of the oxygen absorption reaction catalyst. Further, when an adhesive is prepared or processing is performed using the adhesive from the first embodiment of the oxygen-absorbing solvent-soluble resin of the present invention, it is desirable not to contain the oxygen absorption reaction catalyst in an amount of the catalyst quantity to prevent gelation and the like due to excessive resin deterioration attributable to the oxygen absorption reaction catalyst. Here, the oxygen absorption reaction catalyst includes transition metal salts of an organic acid and transition metal such as manganese, iron, cobalt, nickel, and copper. Additionally, "not containing the oxygen absorption reaction catalyst in an amount of the catalyst quantity" generally means that the amount of the oxygen absorption reaction catalyst in terms of the transition metal is smaller than 10 ppm, preferably smaller than 1 ppm.

In the first embodiment of the oxygen-absorbing solvent-soluble resin of the present invention, the acid component (B) is terephthalic acid. In polymerizing the oxygen-absorbing polyester which is the first embodiment of the oxygen-absorbing solvent-soluble resin of the present invention, terephthalic acid may be esterified as in, for example, dimethyl terephthalate and bis-2-hydroxydiethyl terephthalate.

By using terephthalic acid as the acid component (B), the cohesion force of terephthalic acid improves the cohesion force of the oxygen-absorbing solvent-soluble resin itself. The improvement of the cohesion force improves the adhesion strength of the adhesive, and delamination can also be suppressed. Moreover, the acid component (A) is likely to undergo radical crosslinking reaction by heat during the polymerization. For this reason, as the relative proportion of the acid component (A) contained in the resin is reduced by the acid component (B), the gelation during the polymerization is suppressed, and a high-molecular weight resin can be stably obtained.

The glycol component includes for example ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 19-nonanediol, neopentyl glycol, 1,4-cyclohexane dimethanol, 2-phenylpropanediol, 2-(4-hydroxyphenyl)ethyl alcohol, α,α-dihydroxy-1,3-diisopropylbenzene, o-xylene glycol, m-xylene glycol, p-xylene glycol, α,α-dihydroxy-1,4-diisopropylbenzene, hydroquinone, 4,4-dihydroxydiphenyl, naphthalenediol or derivatives thereof. Aliphatic diols such as ethylene glycol, diethylene glycol, triethylene glycol, 1,4-butanediol, 1,6-hexanediol and neopentyl glycol are preferable, and 1,4-butanediol is more preferable. If 1,4-butanediol is used, the resulting resin has a high ability to absorb oxygen and a small amount of decomposition product is generated in the course of autoxidation. These may be used alone or in any combination of at least two of them.

The ratio of the amount of the acid component (A) to the total amount of the acid components is 40 to 80 mol %, preferably 50 to 70 mol %, and more preferably 60 to 70 mol %. Meanwhile, the ratio of the amount of the acid component (B) to the total amount of the acid components is 15 to 35 mol %, preferably 20 to 35 mol %, and more preferably 20 to 30 mol %. With such relative proportions, an oxygen-absorbing solvent-soluble resin excellent in oxygen absorption ability, adhesiveness, and solubility to an organic solvent can be obtained.

The oxygen absorption ability of the first embodiment of the oxygen-absorbing solvent-soluble resin of the present invention depends on the glass transition temperature of the resin. The range of the glass transition temperature to obtain a sufficient oxygen absorption ability is preferably in the range of −8° C. to 15° C., more preferably in the range of −8°

C. to 10° C., and further preferably in the range of −5° C. to 8° C. Meanwhile, if the glass transition temperature is lower than the above-described range, the cohesion force, that is, the creep resistance, of the resin is lowered. If higher, the adhesive force, that is, the adhesion strength to other materials is lowered. Thus, such resins are not preferable when the oxygen-absorbing solvent-soluble resin of the present invention is employed as the adhesive. An oxygen-absorbing solvent-soluble resin excellent in oxygen absorption ability can be obtained when the compositions of the acid component (A) and the acid component (B) are within the above-described ranges, and the kind and the relative proportion of the glycol component are controlled in such a manner as to set the glass transition temperature within the above-described range. As described below in Example 1, an oxygen-absorbing polyester obtained by polycondensing for example 70 mol % of an isomer mixture containing methyltetrahydrophthalic anhydride (available from Hitachi Chemical Co., Ltd.; HN-2200) as the acid component (A) and 30 mol % of terephthalic acid as the acid component (B) together with 1,4-butanediol has a glass transition temperature of 5.3° C. This is an oxygen-absorbing solvent-soluble resin having an excellent oxygen absorption ability.

Further, the acid component (A), the acid component (B), and the glycol component may be copolymerized with aromatic dicarboxylic acids other than terephthalic acid, aliphatic dicarboxylic acids, aliphatic hydroxycarboxylic acids, polyvalent alcohols, polyvalent carboxylic acids, or derivatives thereof as monomers. Among these, the acid component (A), the acid component (B), and the glycol component are particularly preferably copolymerized with another acid component selected from the group consisting of aromatic dicarboxylic acids, aliphatic dicarboxylic acids, aliphatic hydroxycarboxylic acids, and derivatives thereof. These can be used alone or in any combination of at least two of them. By the copolymerization with the other acid components, the glass transition temperature of the oxygen-absorbing solvent-soluble resin to be obtained can be easily controlled, and the oxygen absorption ability can be improved. Furthermore, the solubility to an organic solvent can also be controlled. Additionally, by controlling the branched structure of the resin through introduction of the polyvalent alcohol and the polyvalent carboxylic acid, the viscosity characteristics of the oxygen-absorbing adhesive composition dissolved in a solvent can be adjusted.

The aromatic dicarboxylic acids other than terephthalic acid and derivatives thereof include benzenedicarboxylic acids such as phthalic anhydride and isophthalic acid, naphthalenedicarboxylic acids such as 2,6-naphthalenedicarboxylic acid, anthracenedicarboxylic acids, sulfoisophthalic acid, sodium sulfoisophthalate, and derivatives thereof. Isophthalic acid is preferable. This is because the copolymerization with isophthalic acid ensures the cohesion force of the oxygen-absorbing solvent-soluble resin while the solubility to a solvent is improved.

The aliphatic dicarboxylic acids and derivatives thereof include oxalic acid, malonic acid, succinic acid, glutaric acid, adipic acid, pimelic acid, suberic acid, azelaic acid, sebacic acid, undecanedioic acid, dodecanedioic acid, 3,3-dimethylpentanedioic acid, and derivatives thereof. Among these, adipic acid and succinic acid are preferable, and succinic acid is particularly preferable.

As described in Examples 6 and 7, the glass transition temperature of the oxygen-absorbing solvent-soluble resin is controlled by copolymerization with succinic acid. Thereby, excellent oxygen absorption ability can be exhibited. The glass transition temperatures of the oxygen-absorbing solvent-soluble resin in Examples 6 and 7 are respectively −4.0° C. and 0.8° C.

The aliphatic hydroxycarboxylic acids and derivatives thereof include glycolic acid, lactic acid, hydroxypivalic acid, hydroxycaproic acid, hydroxyhexanoic acid, and derivatives thereof.

The polyvalent alcohols and derivatives thereof include 1,2,3-propanetriol, sorbitol, 1,3,5-pentanetriol, 1,5,8-heptanetriol, trimethylolpropane, pentaerythritol, 3,5-dihydroxybenzyl alcohol, glycerin, and derivatives thereof.

The polyvalent carboxylic acids and derivatives thereof include 1,2,3-propanetricarboxylic acid, meso-butane-1,2,3,4-tetracarboxylic acid, citric acid, trimellitic acid, pyromellitic acid, and derivatives thereof.

The first embodiment of the oxygen-absorbing solvent-soluble resin of the present invention can be obtained as a polyester by copolymerizing the acid component (A), the acid component (B), and the glycol component with the other acid components described above. In this connection, the ratio of the amount of the structural unit derived from the other acid components in the resin to the total amount of the acid components is preferably 1 to 30 mol %, more preferably 5 to 20 mol %.

In addition, in a case where a component having three functional groups or more such as the polyvalent alcohol and the polyvalent carboxylic acid is copolymerized, the ratio of the amount thereof to the total amount of the acid components is preferably 5 mol % or less.

A second embodiment of the oxygen-absorbing solvent-soluble resin of the present invention is a polyester comprising structural units derived from an acid component (A), succinic acid, and ethylene glycol.

The acid component (A) is as described above.

The second embodiment of the oxygen-absorbing solvent-soluble resin of the present invention comprises the structural units derived from succinic acid and ethylene glycol which have low molecular weights per repeating unit in addition to the acid component (A). This is preferable because the proportion of the acid component (A) is increased on the weight basis in the resin, and the oxygen absorption ability is improved. Thereby, even in a case where the resin is employed as an adhesive layer having a restriction on application amount (layer thickness), an oxygen-absorbing container having excellent performances can be formed.

In the second embodiment of the oxygen-absorbing solvent-soluble resin of the present invention, the ratio of the amount of the acid component (A) to the total amount of the acid components is 45 to 75 mol %, preferably 50 to 70 mol %. Meanwhile, the ratio of the amount of succinic acid to the total amount of the acid components is 25 to 55 mol %, preferably 30 to 50 mol %. In this connection, the glass transition temperature of the resin is preferably −8 to 15° C., more preferably 2 to 15° C., and further preferably 5 to 10° C. If the glass transition temperature is lower than the above-described range, the cohesion force, that is, the creep resistance, of the resin is lowered. If higher, the adhesive force, that is, the adhesion strength to other materials is lowered. Thus, such resins are not preferable when the oxygen-absorbing solvent-soluble resin of the present invention is employed as an adhesive. An oxygen-absorbing solvent-soluble resin excellent in oxygen absorption ability can be obtained when the compositions of the acid component (A) and succinic acid are within the above-described ranges, and the glass transition temperature is set within the above-described range using ethylene glycol.

The first embodiment and the second embodiment of the oxygen-absorbing solvent-soluble resin of the present invention differ from each other in more preferable ranges of glass transition temperature. This comes from the difference in the monomer composition between the resins.

The second embodiment of the oxygen-absorbing solvent-soluble resin of the present invention can be obtained as a polyester by using the acid component (A), succinic acid or succinic anhydride, and ethylene glycol as raw materials. In this connection, aromatic dicarboxylic acids, aliphatic dicarboxylic acids other than succinic acid, aromatic hydroxycarboxylic acids, aliphatic hydroxycarboxylic acids, polyvalent carboxylic acids, glycols other than ethylene glycol, polyvalent alcohols, derivatives thereof, or the like may be copolymerized as another monomer if necessary within a range not impairing the object of the present invention. These can be used alone or in any combination of at least two of them. By the copolymerization with the other components, the glass transition temperature of the oxygen-absorbing solvent-soluble resin to be obtained can be easily controlled, and the oxygen absorption ability can be improved. Furthermore, the solubility to an organic solvent can also be controlled. Additionally, by controlling the branched structure of the resin through introduction of the polyvalent alcohol and the polyvalent carboxylic acid, the viscosity characteristics of the oxygen-absorbing adhesive composition dissolved in a solvent can be adjusted.

As the aromatic dicarboxylic acids, the aliphatic dicarboxylic acids other than succinic acid, the aromatic hydroxycarboxylic acids, the aliphatic hydroxycarboxylic acids, the polyvalent carboxylic acids, the glycols other than ethylene glycol, the polyvalent alcohols, or the derivatives thereof, those cited in the above-described first embodiment of the oxygen-absorbing solvent-soluble resin of the present invention can be preferably used. More preferably examples include as the aromatic dicarboxylic acids isophthalic acid and terephthalic acid. These are preferable because the cohesion force is improved. As for the aliphatic dicarboxylic acids other than succinic acid, adipic acid is preferable because the glass transition temperature of the resin can be easily controlled.

The second embodiment of the oxygen-absorbing solvent-soluble resin of the present invention can be obtained as a polyester by copolymerizing the acid component (A), succinic acid, and ethylene glycol with the other acid components described above. In this connection, the ratio of the amount of the other acid components in the resin to the total amount of the acid components is preferably 1 to 25 mol %, more preferably 1 to 20 mol %.

In addition, in a case where a component having three functional groups or more such as the polyvalent alcohol and the polyvalent carboxylic acid is copolymerized, the ratio of the amount thereof to the total amount of the acid components is preferably 5 mol % or less.

The oxygen-absorbing solvent-soluble resin of the present invention can be obtained by any polyester polycondensation method known to those skilled in the art. Examples thereof include interfacial polycondensation, solution polycondensation, molten polycondensation and solid phase polycondensation.

When the oxygen-absorbing solvent-soluble resin of the present invention is synthesized, a polymerization catalyst is not necessarily used, but it is possible to use usual polyester polymerization catalyst such as for example titanium-containing, germanium-containing, antimony-containing, tin-containing and aluminum-containing polymerization catalysts. In addition, it is also possible to use any known polymerization catalysts such as nitrogen atom-containing basic compounds, boric acid, boric acid esters, and organic sulfonic acid type compounds.

Moreover, in the polymerization, various kinds of additives such as coloration-inhibitory agents and/or antioxidants such as phosphate-containing compounds can be added. The addition of an antioxidant would permit the control of any absorption of oxygen during the polymerization and the subsequent steps and this in turn permits the inhibition of gelation and any quality-deterioration of the resulting oxygen-absorbing solvent-soluble resin.

The number average molecular weight of the oxygen-absorbing solvent-soluble resin of the present invention is preferably 500 to 100,000, more preferably 1,000 to 20,000. Moreover, the weight average molecular weight is preferably 5,000 to 200,000, more preferably 10,000 to 100,000, and further preferably 20,000 to 90,000. If the molecular weight is lower than the above-described range, the cohesion force, that is, the creep resistance, of the resin is lowered. If higher, the coating performance is lowered due to lowered solubility to an organic solvent and increased viscosity of the solution. Thus, such resins are not preferable when the oxygen-absorbing solvent-soluble resin of the present invention is employed as the adhesive. In a case where the molecular weight is within the above-described range, an oxygen-absorbing adhesive resin composition excellent in cohesion force, adhesiveness, and solubility to an organic solvent and having viscosity characteristics preferable as adhesive solution can be obtained.

Moreover, using a chain extender such as an organic diisocyanate, the molecular weight of the oxygen-absorbing solvent-soluble resin of the present invention can be increased. As the organic diisocyanate-based chain extender, various known aromatic, aliphatic or alicyclic diisocyanates can be used. The aromatic diisocyanates include for example 4,4'-diphenylmethane diisocyanate and tolylene diisocyanate. The aliphatic diisocyanates include for example hexamethylene diisocyanate, xylylene diisocyanate, and lysine diisocyanate. The alicyclic diisocyanates include for example cyclohexane-1,4-diisocyanate, isophorone diisocyanate, dicyclohexylmethane-4,4'-diisocyanate, dimer diisocyanate obtained by converting a carboxyl group of a dimer acid into an isocyanate group. Further, these organic diisocyanates can be used as trimethylolpropane adduct, isocyanurate, biuret, or other forms. The organic isocyanates and organic isocyanate derivatives described above may be used alone or in any combination of at least two of them.

The oxygen-absorbing solvent-soluble resin of the present invention may be used alone or in any combination of at least two of them.

The oxygen-absorbing solvent-soluble resin of the present invention can be dissolved in an appropriate solvent such as an organic solvent and used as an oxygen-absorbing adhesive resin composition. The solvent includes ethyl acetate, acetone, methyl ethyl ketone, methyl isobutyl ketone, toluene, xylene, isopropanol, and the like. Particularly, since relatively few odor troubles are caused from the residual solvent, ethyl acetate is a typical solvent of a soft packaging adhesive for dry lamination. From the viewpoint of industrial use, a single solvent of ethyl acetate not containing toluene, xylene, and the like is preferably used as the solvent of the present invention.

The oxygen-absorbing solvent-soluble resin of the present invention has practically acceptable adhesion strength and cohesion force. The oxygen-absorbing adhesive resin composition of the present invention is directly used as a one-pack type adhesive. Nevertheless, as necessary, the oxygen-absorbing adhesive resin composition of the present invention can be used as a two-pack mixing type adhesive together with for example an organic isocyanate-type curing agent. As the organic isocyanate-type curing agent used for the two-pack mixing type adhesive, those aforementioned as the chain extender can be preferably used. However, the oxygen absorption ability of the oxygen-absorbing solvent-soluble resin may be inhibited due to, for example, reduction in mobility thereof, as the isocyanate is cured. In order to exhibit a high oxygen absorption ability, the oxygen-absorbing adhesive resin composition is preferably used as a one-pack type adhesive.

To the oxygen-absorbing adhesive resin composition of the present invention, various kinds of additives such as a silane coupling agent, an antioxidant, a UV absorber, a hydrolysis inhibitor, an anti-mold agent, a curing catalyst, a thickening agent, a plasticizer, a pigment, a filler, a polyester resin, and an epoxy resin can be added if necessary within a range not impairing the object of the present invention.

To laminate multiple films as in the case of general adhesives for dry lamination, the oxygen-absorbing adhesive composition of the present invention can be used. Particularly, the oxygen-absorbing adhesive composition of the present invention can be preferably used for laminating a film substrate having an oxygen barrier property and a sealant film having heat sealability and oxygen gas permeability. The laminate structure in this case is, from the outer side, an oxygen barrier substrate layer/an oxygen-absorbing adhesive resin layer/a sealant layer. This is preferable because of the following reasons. The oxygen barrier substrate inhibits penetration of oxygen from the outside. Thus, the lowering of the oxygen absorption ability of the oxygen-absorbing adhesive resin due to oxygen outside the container is suppressed. In addition, the oxygen-absorbing adhesive resin can quickly absorb oxygen inside the container through the oxygen permeable sealant film.

Each of the film substrate having an oxygen barrier property and the sealant film may be a single layer or a laminate. As the film substrate having an oxygen barrier property, the followings can be used preferably: a biaxially-oriented PET film, a biaxially-oriented polyamide film, a biaxially-oriented polypropylene film or the like having as a barrier layer a vapor-deposited thin film of metal or metal oxide such as silica and alumina or a barrier coating layer mainly made of an organic material with a gas barrier property such as a polyvinyl alcohol resin, an ethylene-vinyl alcohol copolymer, a polyacrylate resin or a vinylidene chloride resin. Additionally, an ethylene-vinyl alcohol copolymer film, a poly(m-xylylene adipamide) film, a polyvinylidene chloride film and a metal foil such as an aluminum foil are also preferable. These film substrates having an oxygen barrier property can be used while the substrates of the same material or at least two of different materials are laminated on each other. Alternatively, it is preferable that a biaxially-oriented PET film, a biaxially-oriented polyamide film, a biaxially-oriented polypropylene film, cellophane, paper, or the like be laminated thereon for use.

As the material of the sealant film, the followings can be used preferably: low-density polyethylene, medium-density polyethylene, high-density polyethylene, linear low-density polyethylene, linear very low-density polyethylene, polypropylene, poly-1-butene, poly-4-methyl-1-pentene, polyolefins such as random or block copolymers of α-olefins (such as ethylene, propylene, 1-butene and 4-methyl-1-pentene), cyclic olefin polymer and cyclic olefin copolymer, ethylene-vinyl compound copolymers such as ethylene-vinyl acetate copolymer, ethylene-(meth)acrylic acid copolymer, ionic crosslinked products thereof (ionomers) and ethylene-methyl methacrylate copolymer, polyesters such as PET, A-PET, PETG, and PBT having heat sealability, amorphous nylons, and the like. At least two of these materials can be blended with each other for use, or the materials of the same kind or different kinds can be laminated on each other for use.

When multiple film substrates are laminated on each other using the oxygen-absorbing adhesive resin composition of the present invention, a known dry laminator can be used. The dry laminator can carry out a series of laminating steps: application of the oxygen-absorbing adhesive resin composition to the barrier film substrate; vaporization of the solvent in a dry oven; and bonding to the sealant film with a nip roller heated to 50 to 120° C. The amount of the oxygen-absorbing adhesive resin composition applied is 0.1 to 30 g/m$^2$, preferably 1 to 15 g/m$^2$, and further preferably 2 to 10 g/m$^2$. The oxygen-absorbing laminated film thus laminated using the oxygen-absorbing adhesive resin composition is preferably subjected to aging so as to proceed the curing reaction at a temperature around room temperature, for example, 10 to 60° C. The curing proceeds by crystallization of the oxygen-absorbing solvent-soluble resin or crosslinking reaction with a curing agent such as an organic diisocyanate. It is preferable that the curing be carried out because the adhesion strength and the cohesion force are improved. Note that the aging is preferably carried out in the absence of oxygen or under oxygen-blocking condition for example by sealing the oxygen-absorbing laminated film with an oxygen impermeable bag or the like. In this manner, the lowering of the oxygen absorption ability by oxygen in air during the aging can be suppressed.

Meanwhile, the oxygen-absorbing solvent-soluble resin of the present invention can be used as a non-solvent adhesive without being dissolved in a solvent. In this case, an oxygen-absorbing laminated film can be obtained using a known non-solvent laminator.

Further, the oxygen-absorbing solvent-soluble resin of the present invention is not limited to adhesive usage, and can be used for paint usage, and can be applied as a coating film for various films.

The oxygen-absorbing laminated film laminated using the oxygen-absorbing solvent-soluble resin of the present invention can be preferably used as bag-like containers having a variety of shapes, and a capping material for tray and cup containers. Examples of such bag-like containers include three sided seal or four sided seal flat pouches, gusseted pouches, standing pouches and pillow-shaped packaging bags.

The oxygen-absorbing container using the oxygen-absorbing laminated film at least partially can effectively inhibit any penetration of external oxygen into the container and can absorb oxygen remaining in the container. For this reason, the container is quite useful since it permits the maintenance of the internal oxygen concentration at a quite low level over a long period of time, the prevention of any quality deterioration of the content thereof due to the action of oxygen present therein and the prolonging of the shelf life of the content.

Examples of contents quite susceptible to deterioration in the presence of oxygen include, in particular, foods such as coffee beans, tea leaves, snacks, baked confectionery prepared from rice, Japanese unbaked and semi-baked cakes, fruits, nuts, vegetables, fish and meat products, pasted products, dried fish and meat, smoked fish and meat, foods boiled in soy sauce, uncooked and cooked rice products, infant foods, jam, mayonnaise, ketchup, edible fats and oils, dressings, sauces and dairy products; beverages such as beer, wine, fruit juices, green tea, and coffee; and other products such as pharmaceutical preparations, cosmetic products and electronic parts, but the present invention is not restricted to these specific ones at all.

EXAMPLES

The present invention will hereunder be described in more detail with reference to the following examples. Each numerical value was determined according to the method specified below.

(1) Number Average Molecular Weight (Mn) and Weight Average Molecular Weight (Mw)

This was determined by the gel permeation chromatography (GPC) technique (HLC-8120 Model GPC available from Tosoh Corporation) and expressed in terms of the value relative to that of the polystyrene. In this case, chloroform was used as the solvent.

(2) Relative Proportions of the Monomer Units in the Oxygen-Absorbing Polyester Resin Using a nuclear magnetic resonance spectroscopy (1H-NMR, EX270 available from JEOL DATUM LTD.), relative proportions of the acid components in the resin were calculated from area ratio of signals of protons of benzene ring from terephthalic acid (8.1 ppm), protons of benzene ring from isophthalic acid (8.7 ppm), methyl protons from succinic acid (2.6 ppm), methyl protons from adipic acid (2.3 ppm), methyl protons adjacent to ethylene groups derived from terephthalic acid and isophthalic acid (4.3 to 4.4 ppm), methyl protons adjacent to ethylene groups derived from methyltetrahydrophthalic anhydride, succinic acid, and adipic acid (4.1 to 4.2 ppm). The solvent used herein is deuterochloroform containing tetramethylsilane as a reference material.

In this connection, it was confirmed that the relative proportions of the acid components in the resins were substantially identical to the amounts (mole ratio) of monomers used in the polymerization.

(3) Glass Transition Point; Tg

This was determined in a nitrogen gas stream at a rate of temperature rise of 10° C./min using a differential scanning calorimeter (DSC6220 available from Seiko Instruments Inc.).

(4) Solubility Evaluation

The solubility was determined as favorable if the liquid phase was a stable single and uniform phase in a transparent or semitransparent state when the resin was mixed with ethyl acetate in a concentration of 20 wt % at room temperature.

(5) Amount of Oxygen Absorbed

A laminated film specimen cut out into 2 cm×10 cm was introduced into an oxygen-impermeable steel foil-laminated cup having an inner volume of 85 cm$^3$, then the cup was heat sealed with an aluminum foil-laminated film cap and stored within an atmosphere maintained at 22° C. After storage for a predetermined time period, the oxygen gas concentration within the cup was determined by a micro-gas chromatograph (M-200 available from Agilent Technology Co., Ltd.) to thus calculate the amount of oxygen absorbed per 1 cm$^2$ of the film. The specimen having oxygen absorbed by an amount of 0.015 ml/cm$^2$ or larger in 7 days and 0.02 ml/cm$^2$ or larger in 14 days was determined as favorable.

(6) Laminate Strength

The laminate strength (unit: N/15 mm) between the aluminum foil and LDPE due to the oxygen-absorbing adhesive was determined by a T-peel test within an atmosphere maintained at 23° C. and 50% RH under the determination condition: peeling speed of 300 mm/min for the 15 mm width of the specimen. The specimen having a laminate strength of 2.0 N/15 mm or higher was determined as favorable.

(7) Creep Resistance

A T-peel creep test was conducted between the aluminum foil and LDPE within an atmosphere maintained at 23° C. and 50% RH at a load of 50 g for the 25 mm width of the specimen. Two hours later, the peeled length (unit: mm) was determined. The specimen having a peeled length of 10 mm or shorter was determined as favorable.

Example 1

To a 500 ml volume separable flask equipped with a stirring machine, a nitrogen gas-introduction tube and a Dean-Stark type water separator, were added 116 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 50 g of terephthalic acid (available from Wako Pure Chemical Industries, Ltd.) as acid component (B), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene. The reaction of these components was continued at a temperature ranging from 150° C. to 200° C. in a nitrogen gas atmosphere over about 6 hours, while removing the water generated. Subsequently, the toluene was removed from the reaction system, and then the polymerization was carried out under a reduced pressure of 0.1 kPa at 200 to 220° C. for approximately 3 hours to thus obtain an oxygen-absorbing polyester resin having Tg of 5.3° C. In this connection, Mn was about 6300, and Mw was 75000.

The resulting oxygen-absorbing resin was dissolved in ethyl acetate in a concentration of 20 wt % at room temperature, and an adhesive solution was prepared. The prepared adhesive solution was applied to the aluminum foil surface of a laminated film of biaxially-oriented PET film (thickness: 12 μm)/aluminum foil (thickness: 7 μm) formed by the dry-lamination technique with a #18 bar coater. After the solvent contained in the adhesive was removed with hot air from a hair dryer, the surface of the laminated film where the adhesive was applied was faced a corona-treated surface of a 30 μm-LDPE film (available from Tamapoly Co,. Ltd.; AJ-3), which were passed through a heat roller at 70° C. to thus obtain an oxygen-absorbing laminated film of biaxially-oriented PET film (thickness: 12 μm)/aluminum foil (thickness: 7 μm)/oxygen-absorbing resin (adhesive) (thickness: 4 μm)/30 μm-LDPE.

The resulting oxygen-absorbing laminated film was used for the evaluation of the amount of oxygen absorbed, the evaluation of the laminate strength, and the evaluation of the creep resistance. Table 1 shows the results.

Example 2

The same polymerization as that of Example 1 was repeated, except that 133 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta4$-tetrahydrophthalic anhydride as acid component (A), 33 g of terephthalic acid (available from Wako Pure Chemical Industries, Ltd.) as acid component (B), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of 0.9° C. was obtained. In this connection, Mn was about 4300, and Mw was 37000.

Further, an oxygen-absorbing film was obtained as in Example 1 and used for each evaluation. Table 1 shows the results.

Example 3

The same polymerization as that of Example 1 was repeated, except that 125 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 42 g of terephthalic acid (available from Wako Pure Chemical Industries, Ltd.) as acid component (B), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of 4.0° C. was obtained. In this connection, Mn was about 5200, and Mw was 51000.

Further, an oxygen-absorbing film was obtained as in Example 1 and used for each evaluation. Table 1 shows the results.

Example 4

The same polymerization as that of Example 1 was repeated, except that 133 g of isomer mixture of methyltetrahydrophthalic anhydride (available from Hitachi Chemical Co., Ltd.; HN-2000) containing 2 mol % of 4-methyl-$\Delta^3$-tetrahydrophthalic anhydride and 13 mol % of cis-3-methyl-$\Delta^4$-tetrahydrophthalic anhydride as acid component (A), 33 g of terephthalic acid (available from Wako Pure Chemical Industries, Ltd.) as acid component (B), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of 1.1° C. was obtained. In this connection, Mn was about 5000, and Mw was 48000.

Further, an oxygen-absorbing film was obtained as in Example 1 and used for each evaluation. Table 1 shows the results.

Example 5

The same polymerization as that of Example 1 was repeated, except that 133 g of cis-3-methyl-$\Delta^4$-tetrahydrophthalic anhydride (available from Tokyo Chemical Industry Co., Ltd.) as acid component (A), 33 g of terephthalic acid (available from Wako Pure Chemical Industries, Ltd.) as acid component (B), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of 1.0° C. was obtained. In this connection, Mn was about 4000, and Mw was 41000.

Further, an oxygen-absorbing film was obtained as in Example 1 and used for each evaluation. Table 1 shows the results.

Example 6

The same polymerization as that of Example 1 was repeated, except that 83 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 50 g of terephthalic acid (available from Wako Pure Chemical Industries, Ltd.) as acid component (B), 24 g of succinic acid (available from Wako Pure Chemical Industries, Ltd.) as another acid component, 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of −4.0° C. was obtained. In this connection, Mn was about 6600, and Mw was 60000.

Further, an oxygen-absorbing film was obtained as in Example 1 and used for each evaluation. Table 1 shows the results.

Example 7

The same polymerization as that of Example 1 was repeated, except that 100 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 50 g of terephthalic acid (available from Wako Pure Chemical Industries, Ltd.) as acid component (B), 12 g of succinic acid (available from Wako Pure Chemical Industries, Ltd.) as another acid component, 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of 0.8° C. was obtained. In this connection, Mn was about 6700, and Mw was 80000.

Further, an oxygen-absorbing film was obtained as in Example 1 and used for each evaluation. Table 1 shows the results.

Example 8

The same polymerization as that of Example 1 was repeated, except that 100 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 33 g of terephthalic acid (available from Wako Pure Chemical Industries, Ltd.) as acid component (B), 33 g of isophthalic acid (available from Wako Pure Chemical Industries, Ltd.) as another acid component, 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of 5.8° C. was obtained. In this connection, Mn was about 6800, and Mw was 82000.

Further, an oxygen-absorbing film was obtained as in Example 1 and used for each evaluation. Table 1 shows the results.

Comparative Example 1

The same polymerization as that of Example 1 was repeated, except that 166 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of −3.3° C. was obtained. In this connection, Mn was about 1700, and Mw was 8100.

Further, an oxygen-absorbing film was obtained as in Example 1 and used for each evaluation. Table 1 shows the results.

Comparative Example 2

The same polymerization as that of Example 1 was repeated, except that 150 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 17 g of terephthalic acid (available from Wako Pure Chemical Industries, Ltd.) as acid component (B), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of −1.5° C. was obtained. In this connection, Mn was about 3400, and Mw was 26000.

Further, an oxygen-absorbing film was obtained as in Example 1 and used for each evaluation. Table 1 shows the results.

Comparative Example 3

The same polymerization as that of Example 1 was repeated, except that 100 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 66 g of terephthalic acid (available from Wako Pure Chemical Industries, Ltd.) as acid component (B), 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of 6.1° C. was obtained. In this connection, Mn was about 7000, and Mw was 81000.

The resulting oxygen-absorbing resin was mixed with ethyl acetate in a concentration of 20 wt % at room temperature, but was not dissolved therein.

Comparative Example 4

The same polymerization as that of Example 1 was repeated, except that 50 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 50 g of terephthalic acid (available from Wako Pure Chemical Industries, Ltd.) as acid component (B), 47 g of succinic acid (available from Wako Pure Chemical Industries, Ltd.) as another acid component, 180 g of 1,4-butanediol (available from Wako Pure Chemical Industries, Ltd.) as glycol component, 300 ppm of isopropyl titanate (available from Kishida Chemical Co., Ltd.) as polymerization catalyst, and 20 ml of toluene were used. Thus, an oxygen-absorbing polyester resin having Tg of −13.1° C. was obtained. In this connection, Mn was about 4900, and Mw was 28000.

Further, an oxygen-absorbing film was obtained as in Example 1 and used for each evaluation. Table 1 shows the results.

TABLE 1

| | Monomer composition, mol % | | | | | Oxygen absorption ability | | | Laminate strength | | Creep resistance | | Overall |
| | acid component (A) | acid component (B) TPA | other acid components | | glycol component | | | | | | | | |
| | | | succinic acid | IPA | 1,4-BG | Solubility | 7 days ml/cm2 | 14 days ml/cm2 | judgment | N/15 mm | judgment | mm | judgment | judgment |
|---|---|---|---|---|---|---|---|---|---|---|---|---|---|---|
| Example 1 | 70 | 30 | — | — | 100 | favorable | 0.023 | 0.027 | ○ | 4.9 | ○ | 0 | ○ | ○ |
| Example 2 | 80 | 20 | — | — | 100 | favorable | 0.029 | 0.032 | ○ | 4.3 | ○ | 10 | ○ | ○ |
| Example 3 | 75 | 25 | — | — | 100 | favorable | 0.027 | 0.03 | ○ | 4.2 | ○ | 1 | ○ | ○ |
| Example 4 | 80 | 20 | — | — | 100 | favorable | 0.018 | 0.022 | ○ | 4.4 | ○ | 9 | ○ | ○ |
| Example 5 | 80 | 20 | — | — | 100 | favorable | 0.037 | 0.05 | ○ | 4.5 | ○ | 7 | ○ | ○ |
| Example 6 | 50 | 30 | 20 | — | 100 | favorable | 0.031 | 0.039 | ○ | 3.6 | ○ | 0 | ○ | ○ |
| Example 7 | 60 | 30 | 10 | — | 100 | favorable | 0.021 | 0.027 | ○ | 3.8 | ○ | 0 | ○ | ○ |
| Example 8 | 60 | 20 | — | 20 | 100 | favorable | 0.024 | 0.029 | ○ | 2.5 | ○ | 1 | ○ | ○ |
| Comparative Example 1 | 100 | 0 | — | — | 100 | favorable | 0.03 | 0.044 | ○ | 5.9 | ○ | >30 | x | x |
| Comparative Example 2 | 90 | 10 | — | — | 100 | favorable | 0.035 | 0.043 | ○ | 6.1 | ○ | >30 | x | x |
| Comparative Example 3 | 60 | 40 | — | — | 100 | unfavorable | — | — | | — | | — | | x |
| Comparative Example 4 | 30 | 30 | 40 | — | 100 | favorable | 0 | 0 | x | 4.6 | ○ | >30 | x | x |

Example 9

To a 500 ml volume separable flask equipped with a stirring machine, a nitrogen gas-introduction tube and a Dean-Stark type water separator, were added 83.1 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 59.0 g of succinic acid (available from Wako Pure Chemical Industries, Ltd.), 93.1 g of ethylene glycol (available from Wako Pure Chemical Industries, Ltd.), 500 ppm of isopropyl titanate (available from Kishida Chemical Co., Ltd.) as polymerization catalyst, and 10 ml of toluene. The reaction of these components was continued at a temperature ranging from 150° C. to 200° C. in a nitrogen gas atmosphere over about 6 hours, while removing the water generated. Subsequently, the toluene was removed from the reaction system, and then the polymerization was carried out under a reduced pressure of 0.1 kPa at 200 to 220° C. for approximately 3 hours to thus obtain a polyester resin having Tg of 3.8° C. In this connection, Mn was about 3100, and Mw was 44500.

The resulting oxygen-absorbing resin was dissolved in ethyl acetate in a concentration of 20 wt % at room temperature, and an adhesive solution was prepared. The prepared adhesive solution was applied to the aluminum foil surface of a laminated film of biaxially-oriented PET film (thickness: 12 μm)/aluminum foil (thickness: 7 μm) formed by the dry-lamination technique with a #18 bar coater. After the solvent contained in the adhesive was removed with hot air from a hair dryer, the surface of the laminated film where the adhesive was applied was faced a corona-treated surface of a 30 μm-LDPE film (available from Tamapoly Co,. Ltd.; AJ-3), which were passed through a heat roller at 70° C. to thus obtain an oxygen-absorbing laminated film of biaxially-oriented PET film (thickness: 12 μm)/aluminum foil (thickness: 7 μm)/oxygen-absorbing resin (adhesive) (thickness: 4 μm)/30 μm-LDPE.

The resulting oxygen-absorbing laminated film was used for the evaluation of the amount of oxygen absorbed, the evaluation of the laminate strength, and the evaluation of the creep resistance. Table 2 shows the results.

Example 10

The same polymerization as that of Example 9 was repeated, except that 99.7 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 47.2 g of succinic acid, 93.1 g of ethylene glycol, 500 ppm of isopropyl titanate as polymerization catalyst, and 10 ml of toluene were used. Thus, a polyester resin having Tg of 7.8° C. was obtained. In this connection, Mn was about 2800, and Mw was 37800.

Further, an oxygen-absorbing film was obtained as in Example 9 and used for each evaluation. Table 2 shows the results.

Example 11

The same polymerization as that of Example 9 was repeated, except that 99.7 g of cis-3-methyl-$\Delta^4$-tetrahydrophthalic anhydride as acid component (A), 47.2 g of succinic acid, 93.1 g of ethylene glycol, 500 ppm of isopropyl titanate as polymerization catalyst, and 10 ml of toluene were used. Thus, a polyester resin having Tg of 8.3° C. was obtained. In this connection, Mn was about 2900, and Mw was 42100.

Further, an oxygen-absorbing film was obtained as in Example 9 and used for each evaluation. Table 2 shows the results.

Example 12

The same polymerization as that of Example 9 was repeated, except that 116.3 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 35.4 g of succinic acid, 93.1 g of ethylene glycol, 500 ppm of isopropyl titanate as polymerization catalyst, and 10 ml of toluene were used. Thus, a polyester resin having Tg of 13.3° C. was obtained. In this connection, Mn was about 2900, and Mw was 49500.

Further, an oxygen-absorbing film was obtained as in Example 9 and used for each evaluation. Table 2 shows the results.

Example 13

The same polymerization as that of Example 9 was repeated, except that 91.4 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 47.2 g of succinic acid, 8.3 g of terephthalic acid (available from Wako Pure Chemical Industries, Ltd.), 93.1 g of ethylene glycol, 500 ppm of isopropyl titanate as polymerization catalyst, and 10 ml of toluene were used. Thus, a polyester resin having Tg of 10.2° C. was obtained. In this connection, Mn was about 3300, and Mw was 40300.

Further, an oxygen-absorbing film was obtained as in Example 9 and used for each evaluation. Table 2 shows the results.

Example 14

The same polymerization as that of Example 9 was repeated, except that 83.1 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 53.1 g of succinic acid, 8.3 g of terephthalic acid (available from Wako Pure Chemical Industries, Ltd.), 93.1 g of ethylene glycol, 500 ppm of isopropyl titanate as polymerization catalyst, and 10 ml of toluene were used. Thus, a polyester resin having Tg of 8.0° C. was obtained. In this connection, Mn was about 3400, and Mw was 47800.

Further, an oxygen-absorbing film was obtained as in Example 9 and used for each evaluation. Table 2 shows the results.

Comparative Example 5

The same polymerization as that of Example 9 was repeated, except that 66.5 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl- $\Delta^4$-tetrahydrophthalic anhydride as acid component (A), 70.9 g of succinic acid, 93.1 g of ethylene glycol, 500 ppm of isopropyl titanate as polymerization catalyst, and 10 ml of toluene were used. Thus, a polyester resin having Tg of −0.8° C. was obtained. In this connection, Mn was about 3200, and Mw was 39400.

Further, an oxygen-absorbing film was obtained as in Example 9 and used for each evaluation. Table 2 shows the results.

Comparative Example 6

The same polymerization as that of Example 9 was repeated, except that 133.0 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 23.6 g of succinic acid, 93.1 g of ethylene glycol, 500 ppm of isopropyl titanate as polymerization catalyst, and 10 ml of toluene were used. Thus, a polyester resin having Tg of 17.7° C. was obtained. In this connection, Mn was about 2800, and Mw was 42700.

Further, an oxygen-absorbing film was obtained as in Example 9 and used for each evaluation. Table 2 shows the results.

Comparative Example 7

The same polymerization as that of Example 9 was repeated, except that 99.7 g of isomer mixture of methyltetrahydrophthalic anhydride (available from Hitachi Chemical Co., Ltd.; HN-2200) containing 45 mol % of 4-methyl-$\Delta^3$-tetrahydrophthalic anhydride and 21 mol % of cis-3-methyl-$\Delta^4$-tetrahydrophthalic anhydride as acid component (A), 58.5 g of adipic acid (available from Wako Pure Chemical Industries, Ltd.), 125.0 g of neopentyl glycol (Tokyo Chemical Industry Co., Ltd.), 500 ppm of isopropyl titanate as polymerization catalyst, and 10 ml of toluene were used. Thus, a polyester resin having Tg of −6.3° C. was obtained. In this connection, Mn was about 3500, and Mw was 27500.

Further, an oxygen-absorbing film was obtained as in Example 9 and used for each evaluation. Table 2 shows the results.

INDUSTRIAL APPLICABILITY

By using an adhesive composition blended with an oxygen-absorbing solvent-soluble resin of the present invention as an alternative to conventional adhesives for dry lamination, a soft packaging material having an excellent deoxidizing ability can be manufactured easily. This oxygen-absorbing soft packaging material can keep the quality of oxygen-sensitive foods, pharmaceutical preparations, electronic parts, and the like over a long period of time.

The invention claimed is:

1. An oxygen-absorbing solvent-soluble resin that is a polyester comprising structural units derived from an acid component (A), an acid component (B), and a glycol component, wherein the ratio of the amount of the acid component (A) to the total amount of the acid components is 40 to 70 mol %, the ratio of the amount of the acid component (B) to the total amount of the acid components is 15 to 30 mol %, the acid component (A) is tetrahydrophthalic acid, a derivative thereof, tetrahydrophthalic anhydride, or a derivative thereof, and the acid component (B) is terephthalic acid.

2. The oxygen-absorbing solvent-soluble resin according to claim 1, wherein the glycol component is 1,4-butanediol.

3. The oxygen-absorbing solvent-soluble resin according to claim 1, further comprising a structural unit derived from succinic acid as another acid component.

4. The oxygen-absorbing solvent-soluble resin according to claim 1, wherein the acid component (A) is methyltetrahydrophthalic acid or methyltetrahydrophthalic anhydride.

5. The oxygen-absorbing solvent-soluble resin according to claim 1, wherein the acid component (A) comprises 50 to 100 mol % of an acid component having a structure selected from the group consisting of the following (i) and (ii):

(i) a dicarboxylic acid or a dicarboxylic anhydride comprising a carbon atom bonded to both groups in the

TABLE 2

| | Resin composition, mol % | | | | | | | Oxygen absorption ability | | | Laminate strength | | Creep resistance | | Overall |
| | acid component | | | glycol component | | | | | | | | | | | |
| | acid compo-nent (A) | suc-cinic acid | adi-pic acid | tere-phthalic acid | ethyl-ene glycol | 1,4-butane-diol | neo-pentyl glycol | Solubility | 7 days ml/cm2 | 14 days ml/cm2 | judg-ment | N/ 15 mm | judg-ment | mm | judg-ment | judg-ment |
|---|---|---|---|---|---|---|---|---|---|---|---|---|---|---|---|---|
| Example 9 | 50 | 50 | — | — | 100 | — | — | favorable | 0.037 | 0.043 | ⊚ | 6.1 | ○ | 0 | ○ | ○ |
| Example 10 | 60 | 40 | — | — | 100 | — | — | favorable | 0.034 | 0.043 | ⊚ | 7.5 | ○ | 0 | ○ | ○ |
| Example 11 | 60 | 40 | — | — | 100 | — | — | favorable | 0.039 | 0.047 | ⊚ | 6.8 | ○ | 0 | ○ | ○ |
| Example 12 | 70 | 30 | — | — | 100 | — | — | favorable | 0.026 | 0.034 | ○ | 2.8 | ○ | 0 | ○ | ○ |
| Example 13 | 55 | 40 | — | 5 | 100 | — | — | favorable | 0.031 | 0.038 | ○ | 7.5 | ○ | 0 | ○ | ○ |
| Example 14 | 50 | 45 | — | 5 | 100 | — | — | favorable | 0.032 | 0.039 | ○ | 7.8 | ○ | 0 | ○ | ○ |
| Comparative Example 5 | 40 | 60 | — | — | 100 | — | — | favorable | 0.035 | 0.04 | ⊚ | 4.2 | ○ | 24 | x | x |
| Comparative Example 6 | 80 | 20 | — | — | 100 | — | — | favorable | 0.02 | 0.028 | ○ | 0.1 | x | 0 | ○ | x |
| Comparative Example 7 | 60 | — | 40 | — | — | — | 100 | favorable | 0.001 | 0.001 | x | 2.8 | ○ | ≥30 | x | x | following structures (a) and (b) and further bonded to one hydrogen atom, the carbon atom being contained in an alicyclic structure:
- (a) a carbon-carbon double bond group, and
- (b) a carbonyl group; and (ii) a dicarboxylic acid or a dicarboxylic anhydride in which
- a carbon atom adjacent to a carbon-carbon double bond in an unsaturated alicyclic structure is bonded to an electron donating substituent and to a hydrogen atom,
- another carbon atom adjacent to the carbon atom is bonded to a carbonyl group, and
- the electron donating substituent and the carbonyl group are in the cis position.

6. The oxygen-absorbing solvent-soluble resin according to claim 5, wherein
the acid component having the structure (i) is 4-methyl-$\Delta^3$-tetrahydrophthalic acid or 4-methyl-$\Delta^3$-tetrahydrophthalic anhydride, and
the acid component having the structure (ii) is cis-3-methyl-$\Delta^4$-tetrahydrophthalic acid or cis-3-methyl-$\Delta^4$-tetrahydrophthalic anhydride.

7. An oxygen-absorbing adhesive resin composition comprising:
the oxygen-absorbing solvent-soluble resin according to claim 1; and
ethyl acetate as a solvent.

* * * * *